United States Patent
Roger et al.

(10) Patent No.: US 11,906,652 B2
(45) Date of Patent: Feb. 20, 2024

(54) PEAK CELL DETECTION AND INTERPOLATION

(71) Applicant: Infineon Technologies AG, Neubiberg (DE)

(72) Inventors: Andre Roger, Munich (DE); Markus Bichl, Feldkirchen-Westerham (DE); Farhan Bin Khalid, Munich (DE)

(73) Assignee: Infineon Technologies AG, Neubiberg (DE)

( * ) Notice: Subject to any disclaimer, the term of this patent is extended or adjusted under 35 U.S.C. 154(b) by 302 days.

(21) Appl. No.: 17/202,757

(22) Filed: Mar. 16, 2021

(65) Prior Publication Data
US 2022/0299597 A1  Sep. 22, 2022

(51) Int. Cl.
G01S 13/536 (2006.01)
G01S 7/35 (2006.01)

(52) U.S. Cl.
CPC ............ *G01S 7/354* (2013.01); *G01S 13/536* (2013.01); *G01S 7/356* (2021.05)

(58) Field of Classification Search
CPC ............................... G01S 7/354; G01S 13/536
See application file for complete search history.

(56) References Cited

U.S. PATENT DOCUMENTS

| | | | |
|---|---|---|---|
| 2006/0164285 A1* | 7/2006 | Fleisher | G01S 13/89 342/179 |
| 2009/0062945 A1* | 3/2009 | Trautmann | G10L 19/093 700/94 |
| 2011/0074621 A1* | 3/2011 | Wintermantel | H01Q 1/3233 342/70 |
| 2018/0045814 A1* | 2/2018 | Slapak | G01S 13/66 |
| 2018/0231636 A1* | 8/2018 | Maher | G01S 13/87 |
| 2019/0340155 A1* | 11/2019 | Brewer | G06F 9/3851 |
| 2019/0391249 A1* | 12/2019 | Takeuchi | G01S 13/536 |
| 2022/0011423 A1* | 1/2022 | Li | G01S 13/584 |
| 2022/0242443 A1* | 8/2022 | Traa | G01S 7/354 |

* cited by examiner

*Primary Examiner* — Bernarr E Gregory
*Assistant Examiner* — Hailey R Le
(74) *Attorney, Agent, or Firm* — Banner & Witcoff Ltd.

(57) ABSTRACT

A Signal Processing Unit (SPU) having a thresholding circuit configured to detect a peak cell of a radar data cube, and to output an identification of the peak cell and energy values of the peak cell and its adjacent cells; and an interpolation circuit coupled to the thresholding circuit, and configured to determine and transmit from the SPU to a Digital Signal Processor (DSP), a relative position of the peak cell between the adjacent cells based on the energy values.

20 Claims, 3 Drawing Sheets

300
Graph of parabolic interpolation
using three samples near a peak cell

PEAK CELL DETECTION AND INTERPOLATION

BACKGROUND

A hardware accelerator detects peak cells in a radar memory by performing a thresholding operation and provides an index of each detected peak cell. A digital signal processor (DSP) (or central processing unit (CPU)) then extracts, from the radar memory, peak cell information to perform parabolic interpolation in the Doppler dimension, range dimension, or optionally, angular dimension.

Increasing resolutions result in increasing the workload for a DSP performing parabolic interpolation. The DSP computes addresses of relevant cells, and reads the radar memory to extract information about the peak cell and cells adjacent to the peak cell. If the format of the read data format is second stage Fast Fourier Transform (FFT) results rather than signal power, the DSP must also compute the signal power before it can perform the parabolic interpolation. The DSP therefore requires energy to access the data, and computing performance to access the data, calculate signal power, and perform the parabolic interpolation.

DETAILED DESCRIPTION

The present disclosure is directed to a signal processing unit (SPU) having a parabolic interpolation circuit that is integrated or tightly coupled with a thresholding circuit. The thresholding circuit detects a peak cell of a radar data cube. The parabolic interpolation circuit then determines on-the-fly an interpolated relative position of the peak cell between adjacent cells, and optionally, an interpolated value of peak energy, thus freeing the DSP to perform other tasks.

Figure 1:
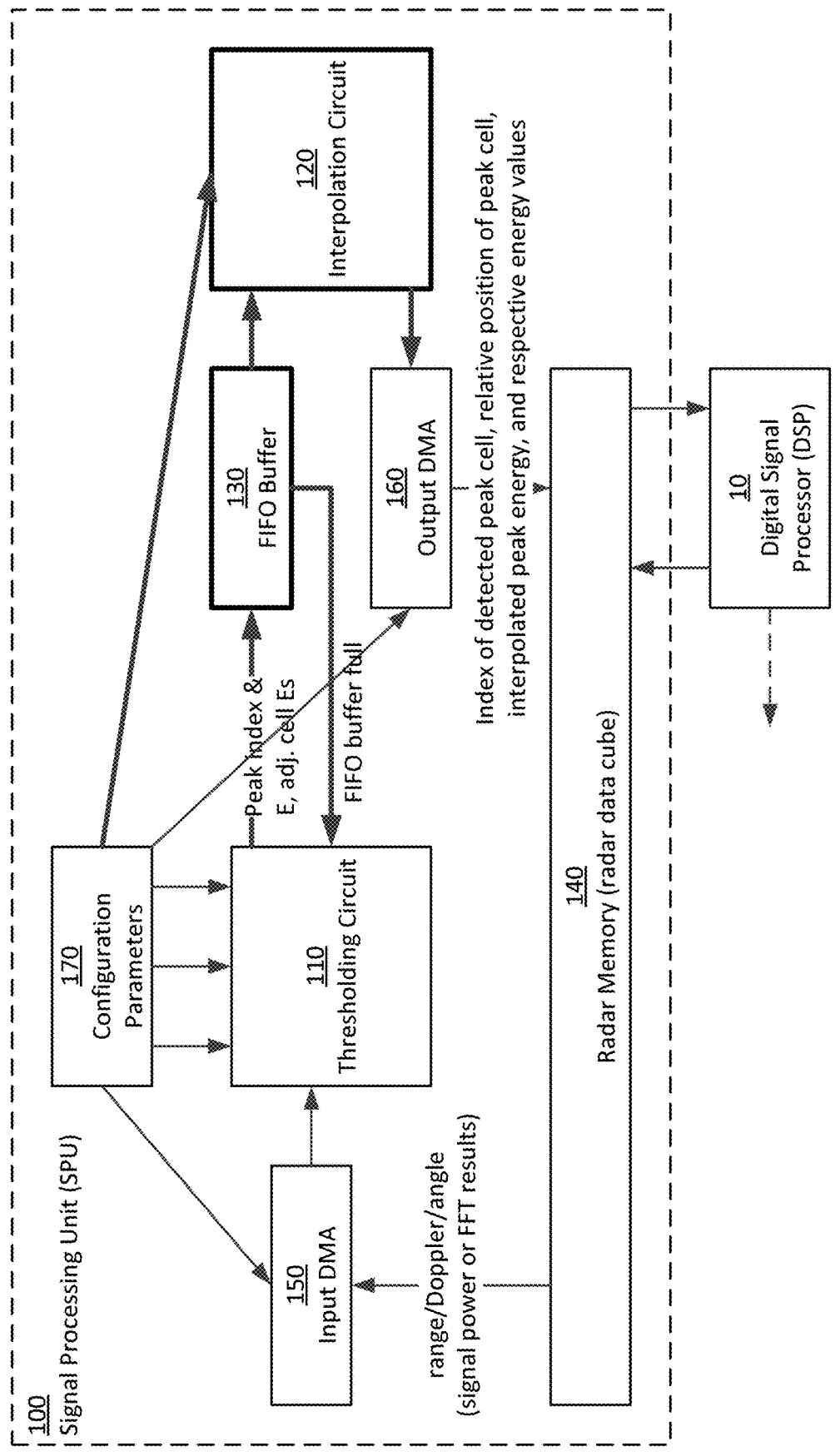
FIG. 1 illustrates a schematic diagram of a Signal Processing Unit (SPU) coupled to a Digital Signal Processor (DSP) in accordance with aspects of the disclosure.
Figure 2:
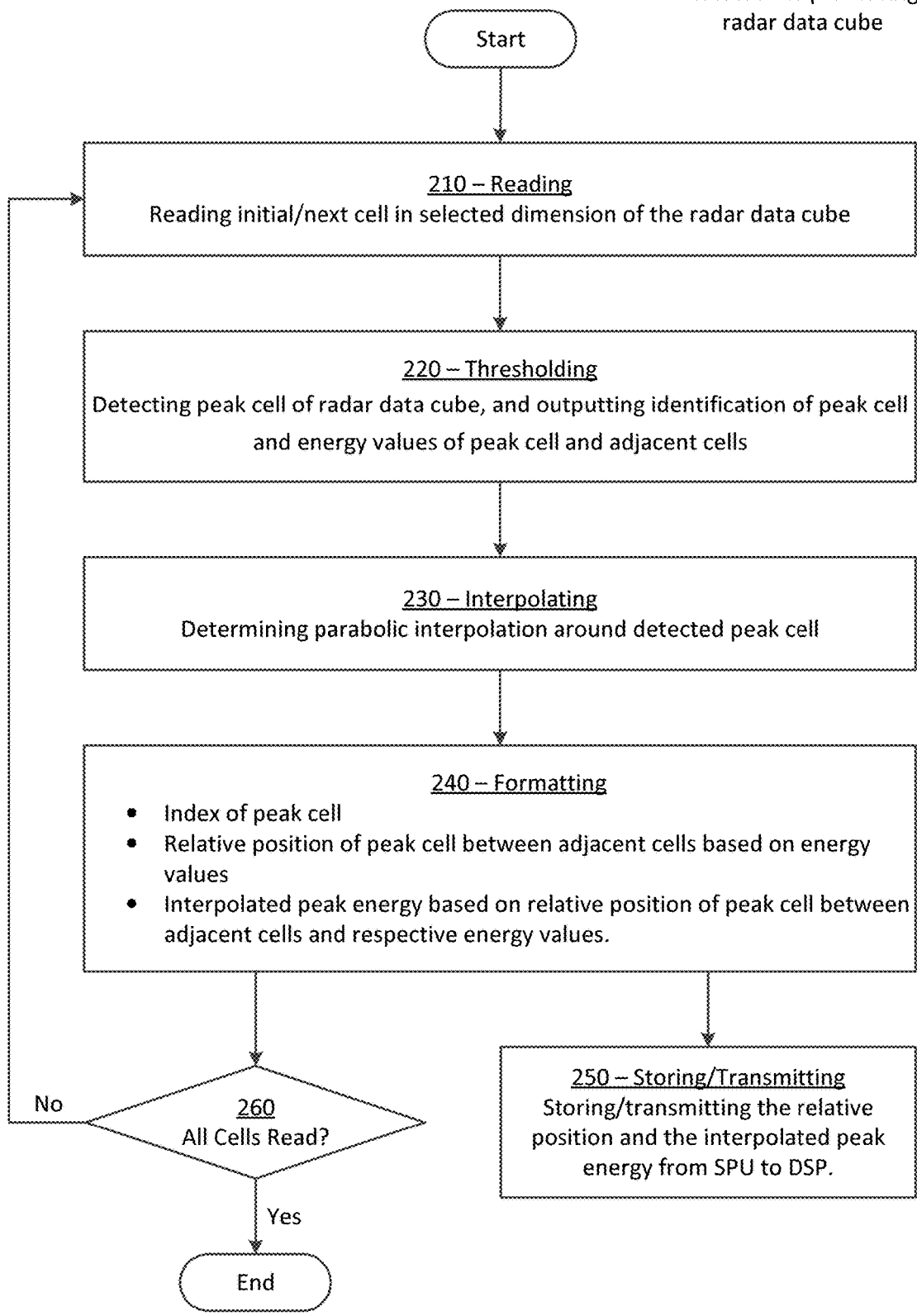
FIG. 2 illustrates a flowchart of a method for processing a radar data cube in accordance with aspects of the disclosure.

FIG. 1 illustrates a schematic diagram of a Signal Processing Unit (SPU) 100 coupled to a Digital Signal Processor (DSP) 10, and FIG. 2 illustrates a flowchart 200 of a corresponding method for processing a radar data cube, in accordance with aspects of the disclosure.

The SPU 100 comprises a thresholding circuit 110, an interpolation circuit 120, a First-In-First-Out (FIFO) buffer 130, a radar memory 140, an input Digital Memory Access (DMA) 150, an output DMA 160, and stored configuration parameters 170.

The radar memory 140 may store a radar data cube, which as is known, provides an intuitive way to represent radar processing as a function of range, Doppler, and angle. The radar data cube is a three-dimensional block with radar returns of a single frequency-modulated continuous wave (FMCW) chirp defined by time represented along one axis (range bins), returns from additional receiver elements along a second axis (angle bins), and a collection of the returns from multiple FMCW chirps (Doppler bins) along the third axis. While a radar data cube is used as an example, the disclosure is not limited in this respect. The aspects of this disclosure is applicable to any-dimensional block of any kind of data as applicable.

At reading step 210, data of an initial or next cell (bin) in a selected dimension of the radar data cube 140 is read by via the input DMA 150. The dimension may be range, Doppler, angular dimension, or cross-section of the radar data cube 140. The data format may be signal power, or alternatively, results from a first, second, or third stage FFT.

Next, at thresholding step 220, the thresholding circuit 110 is configured to detect a peak cell of the radar data cube 140, and to output an identification (index) of the peak cell, and also energy values of the peak cell and its adjacent cells to the FIFO buffer 130. While it is also possible to identify the indices of the adjacent cells in addition to that of the peak cell, since the adjacent cells are direct neighbors, it is sufficient to store the peak cell index only. Also, the thresholding circuit 110 need not generate a relative peak cell every three cells as it is generally not the case for two consecutive cells to be peak cells.

The thresholding circuit 110 in this example is a Constant False Alarm Rejection (CFAR) circuit having a threshold value that is adjustable for each cell comparison. CFAR, as is known, is a threshold method for FFT result analysis which may be based on a signal power. CFAR adapts a threshold to decide whether the FFT signal indicates a potential target to be detected using radar. The disclosure is not limited to the thresholding circuit 110 being a CFAR circuit, but alternatively may be any applicable type of thresholding circuit.

The thresholding circuit 110 may be a peak detection circuit having a threshold value that is fixed for a subset of cells. Alternatively, the thresholding circuit 110 may be configured to detect the peak cell by determining that the adjacent cells have lower energy values than the peak cell. The thresholding circuit 110 may be configured to detect the peak cell in a range dimension and/or a Doppler dimension of the radar data cube 140. Alternatively, the thresholding circuit 110 may be configured to detect the peak cell in the angular dimension or a radar cross section of the radar data cube 140. The adjacent cells may comprise two adjacent cells, with one adjacent cell on each side of the peak cell. Alternatively, the adjacent cells may comprise a plurality of adjacent cells on at least one side of the peak cell.

The thresholding circuit 110 disclosed herein provide more information as compared with previous solutions. Not only does the thresholding circuit 110 provide the index of the detected peak cell, but also the energy of the detected peak cell and the energies of the adjacent cells. Providing this information enables the interpolation circuit 120, to performed computations on-the-fly.

At interpolating step 230, the interpolation circuit 120, which is coupled to the thresholding circuit 110, is configured to determine a relative position of the peak cell between the adjacent cells based on the energy values of the peak cell and the adjacent cells. The interpolation circuit 120 is configured to interpolate the peak energy based on the relative position of the peak cell between the adjacent cells and the respective energy values. The interpolation circuit 120 may be a parabolic or quadrature interpolation circuit. Because FFT peaks appear as parabolic peaks of energy, parabolic interpolation can be used to estimate between two cells the relative position of the peak cell, and the estimated energy of the peak cell does not need to be computed as frequently as the peak cell estimated position between the adjacent cells. Also, the energy of the peak cell may be estimated with higher precision in any dimension.

The interpolation circuit 120 might run slower than the thresholding circuit 110. Optionally, a memory buffer may be coupled between the thresholding circuit 110 and the interpolation circuit 120 to store the index of the peak cell and the energies of the peak cell and the adjacent cells. The memory buffer in this example is a FIFO buffer 130, but the disclosure is not limited in this respect. The FIFO buffer 130 is configured to pause operations by the thresholding circuit 110 until space in the FIFO buffer 130 is available. This FIFO buffer 130 can slow results from the thresholding circuit 110 to optimize computation requirements on the interpolation circuit 120 while allowing the thresholding circuit 110 to continue to operate at its maximum speed.

At formatting step 240, the information from the interpolation circuit 120 is formatted to be stored in the radar memory 140. This information may include the index of peak cell, the relative position of the peak cell between adjacent cells based on energy values, the interpolated peak energy based on the relative position of peak cell between adjacent cells and/or respective energy values.

At step 250 the interpolation circuit 120 is configured to store in the radar memory 140, via the output DMA 160, the index of the formatted information (index of peak cell, the relative position of the peak cell between adjacent cells based on energy values, the interpolated peak energy based on the relative position of peak cell between adjacent cells and/or respective energy values). The DMA 10 may retrieve this information from the radar data cube 140 of the SPU 100 when needed for further processing.

The stored configuration parameters 170 may be, for example, peak criteria, memory region to analyze, dimension of analysis (range, Doppler, angle). Any of the stored configuration parameters 170 may be input to the thresholding circuit 110, the interpolation circuit 120, the input DMA 150, and the output DMA 160.

At step 260, if not all cells have been read, the method returns to step 210. Alternatively, if all of the cells have been read, the method ends.

Figure 3:
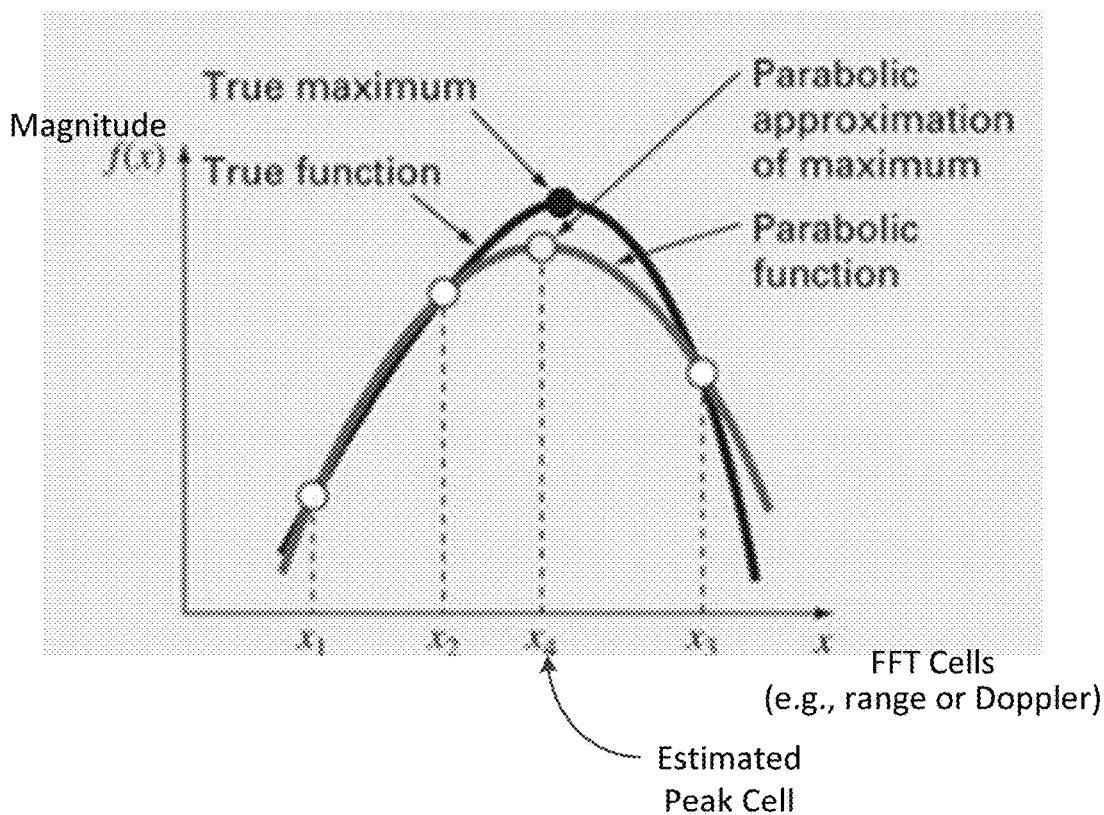
FIG. 3 illustrates a graph of parabolic interpolation using three samples near a peak cell in accordance with aspects of the disclosure.

FIG. 3 illustrates a graph 300 of an example parabolic interpolation using three cells near a peak cell. Parabolic interpolation of three cells to estimate a location of the peak cell of a parabola defined as the interpolation of three cells ($x_1$, $x_2$, and $x_3$) may be performed based on the following equation:

$$x_4 = x_2 - \frac{1}{2} \frac{(x_2-x_1)^2[f(x_2)-f(x_3)] - (x_2-x_3)^2[f(x_2)-f(x_1)]}{(x_2-x_1)[f(x_2)-f(x_3)] - (x_2-x_3)[f(x_2)-f(x_1)]} \quad \text{(Equation 1)}$$

The estimated peak cell $x_4$ and the adjacent cells are used for the next iteration of the algorithm. $f(x)$ is the function of the parabolic curve, for example, $f(x_2)$ is the value of the parabolic curve at time $x_2$. In a simplified case, the parabolic interpolation may be performed based on a peak cell and one adjacent cell to each of the left and right of the peak cell.

The aspects disclosed herein provide many benefits as compared with previous solutions. Fewer radar data cube accesses are required thereby reducing energy consumption. Interpolation is performed concurrently with the peak detection, thereby reducing latency. And since the DSP has access to the interpolation results rather than performing the interpolation itself, the DSP is freed up to perform other tasks.

The techniques of this disclosure may also be described in the following examples.

Example 1. A Signal Processing Unit (SPU), comprising: a thresholding circuit configured to detect a peak cell of a radar data cube, and to output an identification of the peak cell and energy values of the peak cell and its adjacent cells; and an interpolation circuit coupled to the thresholding circuit, and configured to determine and transmit from the SPU to a Digital Signal Processor (DSP), a relative position of the peak cell between the adjacent cells based on the energy values.

Example 2. The SPU of claim 1, wherein the interpolation circuit is further configured to interpolate a peak energy based on the relative position of the peak cell between the adjacent cells and the respective energy values, and to transmit the interpolated peak energy from the SPU to the DSP.

Example 3. The SPU of claim 1, further comprising: a memory buffer coupled between the thresholding circuit and the interpolation circuit, and configured to pause operations by the thresholding circuit until space in the memory buffer is available.

Example 4. The SPU of claim 3, wherein the memory buffer is a First-In-First-Out (FIFO) memory buffer.

Example 5. The SPU of claim 1, wherein the thresholding circuit is a Constant False Alarm Rejection (CFAR) circuit having a threshold value that is adjustable for each cell comparison.

Example 6. The SPU of claim 1, wherein the thresholding circuit is a peak detection circuit having a threshold value that is fixed for a subset of cells.

Example 7. The SPU of claim 1, wherein the thresholding circuit is configured to detect the peak cell by determining that the adjacent cells have lower energy values than the peak cell.

Example 8. The SPU of claim 1, wherein the interpolation circuit is a parabolic or quadrature interpolation circuit.

Example 9. The SPU of claim 1, wherein the adjacent cells comprise two adjacent cells, with one adjacent cell on each side of the peak cell.

Example 10. The SPU of claim 1, wherein the adjacent cells comprise a plurality of adjacent cells on at least one side of the peak cell.

Example 11. The SPU of claim 1, wherein the thresholding circuit is configured to detect the peak cell in a range dimension, a Doppler dimension, or an angular dimension of the radar data cube.

Example 12. The SPU of claim 11, wherein the thresholding circuit is configured to detect the peak cell in the range dimension, the Doppler dimension, and the angular dimension of the radar data cube.

Example 13. A method for a Signal Processing Unit (SPU) processing a radar data cube, comprising: detecting, by a thresholding circuit, a peak cell of the radar data cube; outputting, by the thresholding circuit, an identification of the peak cell and energy values of the peak cell and its adjacent cells; and determining and transmitting from the SPU to a Digital Signal Processor (DSP), by an interpolation circuit coupled to the thresholding circuit, a relative position of the peak cell between the adjacent cells based on the energy values.

Example 14. The method of claim 13, further comprising: interpolating, by the interpolation circuit, a peak energy based on the relative position of the peak cell between the adjacent cells and the respective energy values; and transmitting the interpolated peak energy from the SPU to the DSP.

Example 15. The method of claim 13, further comprising: pausing operations by the thresholding circuit, using a memory buffer coupled between the thresholding circuit and the interpolation circuit, until space in the memory buffer is available.

Example 16. The method of claim 13, further comprising: detecting, by the thresholding circuit, the peak cell by determining that the adjacent cells have lower energy values than the peak cell.

Example 17. The method of claim 13, wherein the interpolation circuit is configured to perform parabolic or quadrature interpolation.

Example 18. The method of claim 13, further comprising: detecting, by the thresholding circuit, the peak cell in a range dimension or a Doppler dimension of the radar data cube.

Example 19. The method of claim 13, further comprising: detecting, by the thresholding circuit, the peak cell in the range dimension and the Doppler dimension of the radar data cube.

Example 20. The method of claim 13, further comprising: detecting, by the thresholding circuit, the peak cell in the angular dimension or the radar cross section of the radar data cube.

While the foregoing has been described in conjunction with exemplary embodiment, it is understood that the term "exemplary" is merely meant as an example, rather than the best or optimal. Accordingly, the disclosure is intended to cover alternatives, modifications and equivalents, which may be included within the scope of the disclosure.

Although specific embodiments have been illustrated and described herein, it will be appreciated by those of ordinary skill in the art that a variety of alternate and/or equivalent implementations may be substituted for the specific embodiments shown and described without departing from the scope of the present disclosure. This disclosure is intended to cover any adaptations or variations of the specific embodiments discussed herein.

What is claimed is:

1. A Signal Processing Unit (SPU), comprising:
a radar memory configured to store a radar data cube;
a thresholding circuit connected to the radar memory, and configured to detect a peak cell of the radar data cube, and to output an identification of the peak cell and energy values of the peak cell and its adjacent cells;
an interpolation circuit coupled to the thresholding circuit, and configured to determine and transmit from the SPU to a Digital Signal Processor (DSP), a relative position of the peak cell between the adjacent cells based on the energy values output from the thresholding circuit; and
a memory buffer connected between the thresholding circuit and the interpolation circuit buffer, and configured to store the identification of the peak cell and energy values of the peak cell and its adjacent cells output by the thresholding circuit,
wherein the interpolation circuit is configured to determine the relative position of the peak cell between the adjacent cells based on energy values obtained from the memory buffer.

2. The SPU of claim 1, wherein the interpolation circuit is further configured to interpolate a peak energy based on the relative position of the peak cell between the adjacent cells and the respective energy values, and to transmit the interpolated peak energy from the SPU to the DSP.

3. The SPU of claim 1, further comprising:
a memory buffer coupled between the thresholding circuit and the interpolation circuit, and configured to pause operations by the thresholding circuit until space in the memory buffer is available.

4. The SPU of claim 3, wherein the memory buffer is a First-In-First-Out (FIFO) memory buffer.

5. The SPU of claim 1, wherein the thresholding circuit is a Constant False Alarm Rejection (CFAR) circuit having a threshold value that is adjustable for each cell comparison.

6. The SPU of claim 1, wherein the thresholding circuit is a peak detection circuit having a threshold value that is fixed for a subset of cells.

7. The SPU of claim 1, wherein the thresholding circuit is configured to detect the peak cell by determining that the adjacent cells have lower energy values than the peak cell.

8. The SPU of claim 1, wherein the interpolation circuit is a parabolic or quadrature interpolation circuit.

9. The SPU of claim 1, wherein the adjacent cells comprise two adjacent cells, with one adjacent cell on each side of the peak cell.

10. The SPU of claim 1, wherein the adjacent cells comprise a plurality of adjacent cells on at least one side of the peak cell.

11. The SPU of claim 1, wherein the thresholding circuit is configured to detect the peak cell in a range dimension, a Doppler dimension, or an angular dimension of the radar data cube.

12. The SPU of claim 11, wherein the thresholding circuit is configured to detect the peak cell in the range dimension, the Doppler dimension, and the angular dimension of the radar data cube.

13. A method for a Signal Processing Unit (SPU) processing a radar data cube, comprising:
detecting, by a thresholding circuit connected to a radar memory configured to store the radar data cube, a peak cell of the radar data cube;
outputting, by the thresholding circuit, an identification of the peak cell and energy values of the peak cell and its adjacent cells;
determining and transmitting from the SPU to a Digital Signal Processor (DSP), by an interpolation circuit coupled to the thresholding circuit, a relative position of the peak cell between the adjacent cells based on the energy values output from the thresholding circuit; and
storing, in a memory buffer connected between the thresholding circuit and the interpolation circuit, the identification of the peak cell and energy values of the peak cell and its adjacent cells output by the thresholding circuit,
wherein the determining the relative position of the peak cell between the adjacent cells is based on energy values obtained by the interpolation circuit from the memory buffer.

14. The method of claim 13, further comprising:
interpolating, by the interpolation circuit, a peak energy based on the relative position of the peak cell between the adjacent cells and the respective energy values; and
transmitting the interpolated peak energy from the SPU to the DSP.

15. The method of claim 13, further comprising:
pausing operations by the thresholding circuit, using a memory buffer coupled between the thresholding circuit and the interpolation circuit, until space in the memory buffer is available.

16. The method of claim 13, further comprising:
detecting, by the thresholding circuit, the peak cell by determining that the adjacent cells have lower energy values than the peak cell.

17. The method of claim 13, wherein the interpolation circuit is configured to perform parabolic or quadrature interpolation.

18. The method of claim 13, further comprising:
detecting, by the thresholding circuit, the peak cell in a range dimension or a Doppler dimension of the radar data cube.

19. The method of claim 18, further comprising:
detecting, by the thresholding circuit, the peak cell in the range dimension and the Doppler dimension of the radar data cube.

20. The method of claim 13, further comprising:
detecting, by the thresholding circuit, the peak cell in an angular dimension or a radar cross section of the radar data cube.

* * * * *